June 23, 1925.

G. L. CLOOK

SHOCK ABSORBER

Filed March 28, 1922

1,542,858

INVENTOR
G. L. Clook

BY Howard P Denison
ATTORNEY.

Patented June 23, 1925.

1,542,858

UNITED STATES PATENT OFFICE.

GEORGE L. CLOOK, OF SYRACUSE, NEW YORK.

SHOCK ABSORBER.

Application filed March 28, 1922. Serial No. 547,374.

*To all whom it may concern:*

Be it known that I, GEORGE L. CLOOK, a citizen of the United States of America, of Syracuse, in the county of Onondaga, in the State of New York, have invented new and useful Improvements in Shock Absorbers, of which the following, taken in connection with the accompanying drawings, is a full, clear, and exact description.

This invention relates to a shock absorber adapted to be used in the connection between the ends of the body-supporting-springs and frame of motor vehicles and particularly Ford cars.

The main object is to provide a simple, compact and efficient shock absorber capable of being easily and quickly attached to the usual body-supporting-springs and running gear by simply substituting it for the usual connection.

Another object is to reduce to a minimum the amplitude of vibration of the body and its main supporting-springs and thereby to enable the occupants to ride with greater ease and comfort with a minimum vertical or lateral swaying motion.

Other objects and uses relating to specific parts of the device will be brought out in the following description:

In order that my invention may be clearly understood, I have shown a portion of a motor vehicle body —A—, front and rear axles —B— and —C—, and body-supporting-springs —D— and —E— of the semi-elliptic leaf type extending lengthwise of and directly over the respective axles —B— and —C—, all of which parts may be of the usual construction.

The shock absorbers forming the subject matter of this invention are connected to and between the ends of each spring and adjacent portions of the frame of the machine and although those at the rear end of the machine are slightly different in form from those at the front end of the machine, each embodies substantially the same elements and comprises a relatively fixed abutment —1—, a rocking member —2— having abutments —3— disposed at opposite sides of and in spaced relation to the fixed abutment —1— and coil springs —4— and —5— interposed between the abutments —1— and —3—, each lever —2— being provided with means at one side of its fulcrum for attachment to the adjacent end of the corresponding body-supporting-spring.

The abutment —1— of each of the rear shock absorbers is formed upon one end of the supporting-arm or bracket —6— having its other end firmly secured by a clamping bolt —7— and stud —8— to the upper inner face of the adjacent brake-case —C— of the rear axle section of the frame of the machine, said rear brackets extending upwardly and inwardly toward each other some distance above the rear axle —C—.

Figure 1:
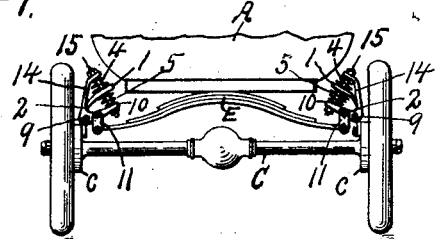
Figures 1 and 2 are, respectively, a rear elevation and a front elevation of portions of the body and running gear of a motor vehicle showing my improved shock absorbers in operative position.
Figure 2:
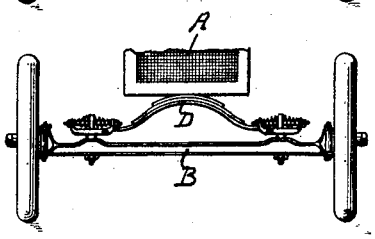
Figure 3:
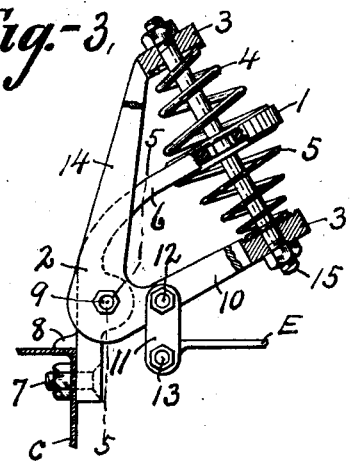
Figure 3 is an enlarged elevation partly in section of one of the rear shock absorbers and adjacent portion of the frame and body-supporting-spring.
Figure 5:
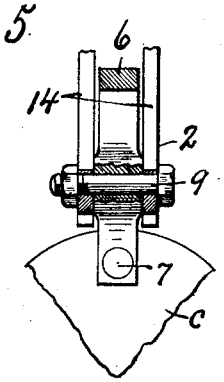
Figure 5 is a detail sectional view taken on line 5—5, Figure 3.
Figure 4:
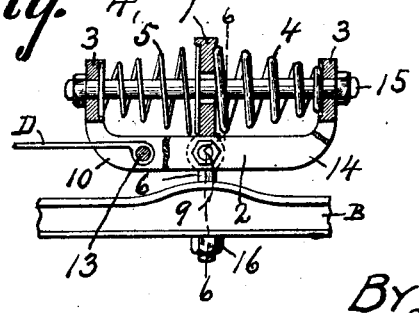
Figure 4 is an elevation partly in section of one of the front shock absorbers and adjacent portion of the axle and body-supporting-spring.
Figure 6:
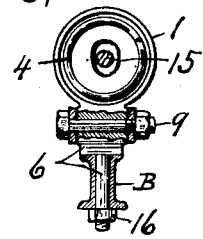
Figure 6 is a detail sectional view taken in the plane of line 6—6, Figure 4.

The lever —2— is preferably U-shaped and slotted longitudinally throughout its length between the abutments —3— to permit it to be placed over and upon the opposite sides of the brackets —6— to which it is pivoted or fulcrumed intermediate its ends by means of a pivotal pin or bolt —9— passing through registering apertures in the bracket and opposite sides of the lever as shown in Figure 5.

The abutments —3— are formed upon the ends of the opposite arms of the lever —2— to provide seats for the adjacent ends of the springs —4— and —5— while the opposite ends of the springs are seated against the opposite adjacent faces of the intermediate fixed abutment —1—, thereby allowing the lever to rock in opposite direction against the action of said springs which are tensioned to normally hold the abutments —3— in spaced relation to the abutment —1—.

The inner arms as —10— of the levers are connected by clips —11— to the underlying ends of the body-supporting-springs —E—, said clips being pivotally connected by bolts —12— to the arms —10— between the lever pivot —9— and corresponding abutments —3—, while the lower ends of the clips are pivotally connected by bolts —13— to the adjacent ends of the springs to allow clips to rock longitudinally of and relatively to the spring —E— and arm —10—.

The opposite arm as —14— is slidably engaged with opposite sides of the bracket —6— which in addition to the pivotal bolt —9— guides the lever in its rocking movement and holds it against relative forward and rearward movement.

The coil spring —4— between the abutment —1— and arm —14— is considerably stiffer or heavier than the opposite spring —5— to take the initial load transmitted thereto from the spring —E— through the medium of the clip —11— and lever —2— while the lighter spring —5— interposed between the arm —10— and abutment —1— is sufficiently stiff to prevent excessive rebound of the main spring —E—, the two springs of each device serving to limit the amplitude of vibration of the main springs and body.

That is, the vertical vibration of the runing gear in passing over obstructions and uneven road surfaces is transmitted directly to the springs —4— through the medium of the bracket —6—, thereby relieving to a considerable degree the transmission of such vibration to the body of the vehicle.

On the other hand, the load of the body on the main springs is partially transmitted to the coil springs —4— through the medium of the lever —2— and clip —11— to afford greater resiliency of movement to said body.

It is also evident that any sudden upward thrust of the opposite ends of the body-supporting-springs, as for example, when the vehicle is passing over heavy obstructions is at least partially offset or counteracted by the springs —5—, which are tensioned to resist such upward thrust through the medium of the arm —10— and link —11—.

A bolt —15— is passed through alined openings in the abutments —1— and —3— and also through the coil springs —4— and —5— to stiffen the arms —10— and —14— against spreading and also to prevent accidental displacement of the coil springs —4— and —5— which are seated at their ends in suitable sockets in the abutments —1— and —3—, the opening in the fixed abutment —1— being elongated or relatively larger than the bolt —15— to allow said bolt to move freely therein as the lever —2— is rocked relatively to the bracket —6—.

The description applied to the rear shock absorber also applies to that used in connection with the front spring in that each front shock absorber is provided with an abutment —1—, a U-shaped lever —2— fulcrumed or pivoted to a bracket —6— intermediate its ends by means of a pivotal bolt —9— and has its opposite arms terminating in abutments —3— at opposite sides of and in spaced relation to the fixed abutment —1—, said abutments forming seats for coil springs —4— and —5—, one of which as —4— is stiffer or heavier than the spring —5— to take the load transmitted thereto by the front body supporting spring —D— through the medium of the lever —2—.

In this construction, however, the main spring —D— is connected directly to the adjacent arm of the lever —2— by means of a pivotal bolt —12— while the bracket —6— is provided with a threaded shank extending through an opening in the axle —B— and secured in place by a nut —16—.

It will be noted in both constructions that the main body-supporting-spring is connected to the side of the lever —2— at which the lighter spring —5— is located and that the load upon the body is first borne by the main spring and thereby transmitted to the heavier coil spring —4— through the medium of the lever —2— to afford greater resiliency to the action of the body particularly in light loads, while the springs —5— serve to ease off the rebound of the main spring and thereby to prevent transmission of this rebound to the body of the vehicle, all of which greatly reduces the amplitude of vertical vibration of the body and at the same time reduces the liability of breaking the main springs by upward rebound which usually occurs by excessive upward rebound of the body.

What I claim is:—

1. A shock absorber for spring vehicles comprising a pair of U-shaped levers adapted to be mounted upon the axle of the vehicle, a leaf spring for supporting the body of the vehicle and having its ends operatively connected to corresponding arms of the levers, abutments rigidly connected to the brackets and interposed between the arms of the adjacent levers, said abutments being provided with bolt openings therethrough, bolts slidable endwise in said openings and connecting the arms of the corresponding levers, and coiled springs interposed between said abutments and arms of the adjacent levers and surrounding the corresponding bolts.

2. A shock absorber for spring vehicles comprising a bracket adapted to be secured to the axle of the vehicle and provided with an abutment, a U-shaped lever pivotally fulcrumed on the bracket and having its opposite arms disposed at opposite sides of and in spaced relation to the abutment, means for attaching one of the arms of the lever to one end of the body-supporting spring of the vehicle, and co-axial coiled springs interposed between the abutment and opposite arms of the lever.

3. A shock absorber for spring vehicles comprising a bracket adapted to be secured to the axle of the vehicle and provided with an abutment, a U-shaped lever pivotally fulcrumed on the bracket and having its opposite arms disposed at opposite sides of and in spaced relation to the abutment, means for attaching one of the arms of the lever to one end of the body-supporting spring of the vehicle and co-axial coiled springs interposed between the abutment and opposite arms of the lever; and a bolt extending through the coiled springs and loosely through an opening in the abutment and having its opposite ends connected to the arms of the lever.

In witness whereof I have hereunto set my hand this 25th day of March, 1922.

GEORGE L. CLOOK.

Witnesses:
 M. C. RILL,
 H. E. CHASE.